Figure 1:
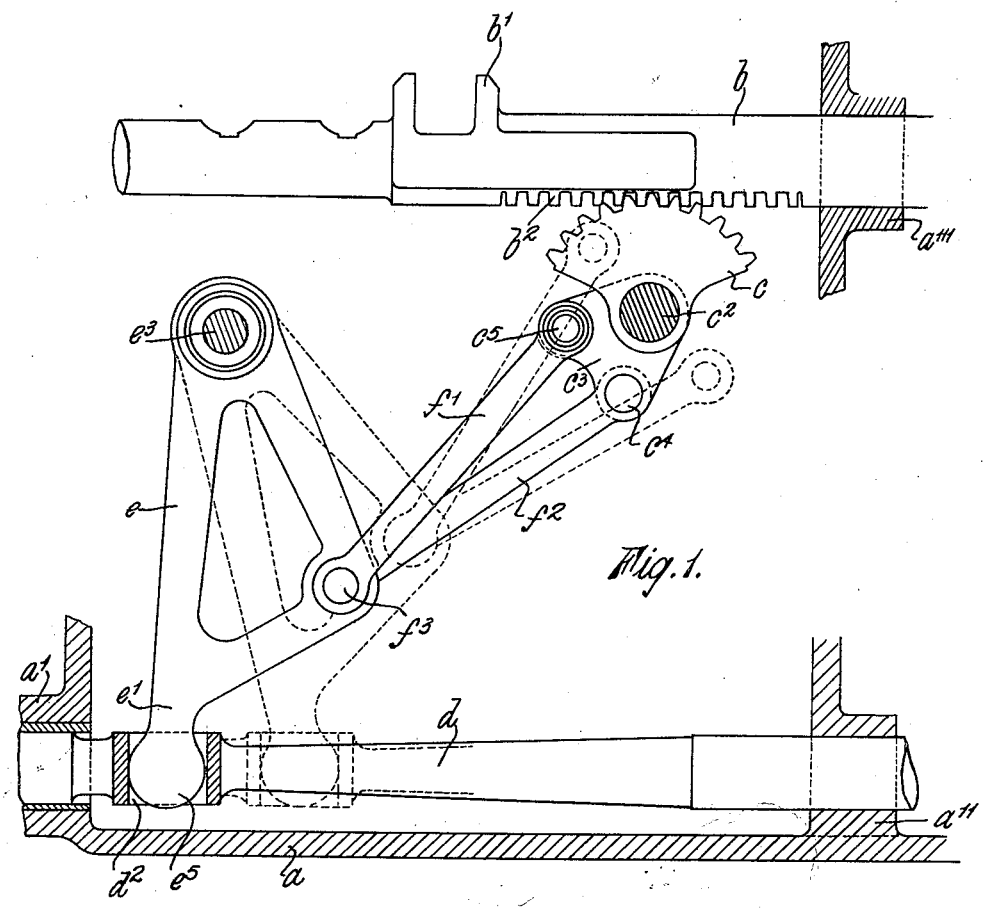

Nov. 18, 1924.

F. H. ROYCE 1,516,309

CHANGE SPEED GEAR MECHANISM FOR MECHANICALLY PROPELLED VEHICLES

Filed May 14, 1924    3 Sheets-Sheet 1

Inventor:

FREDERICK HENRY ROYCE.

Attorney:

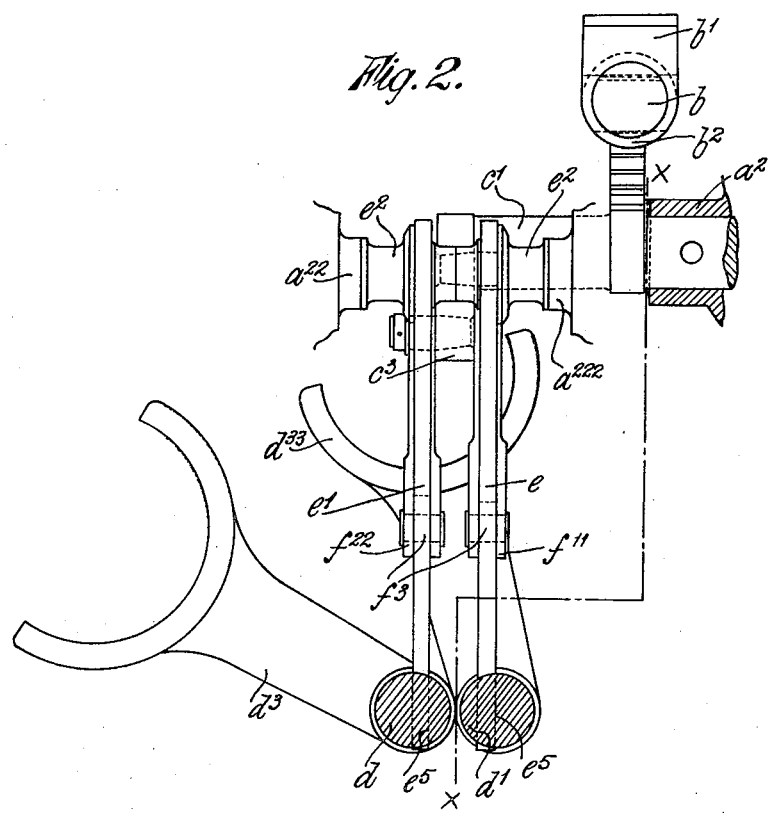

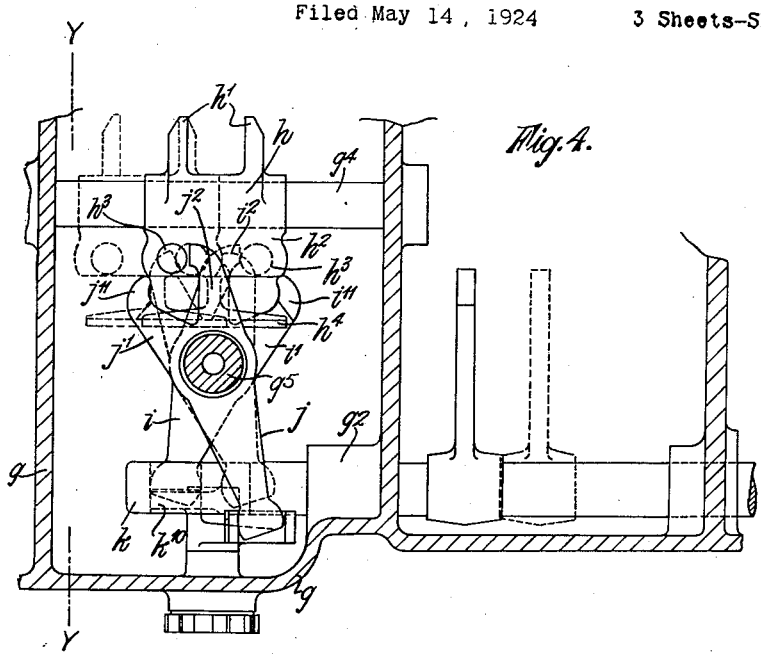
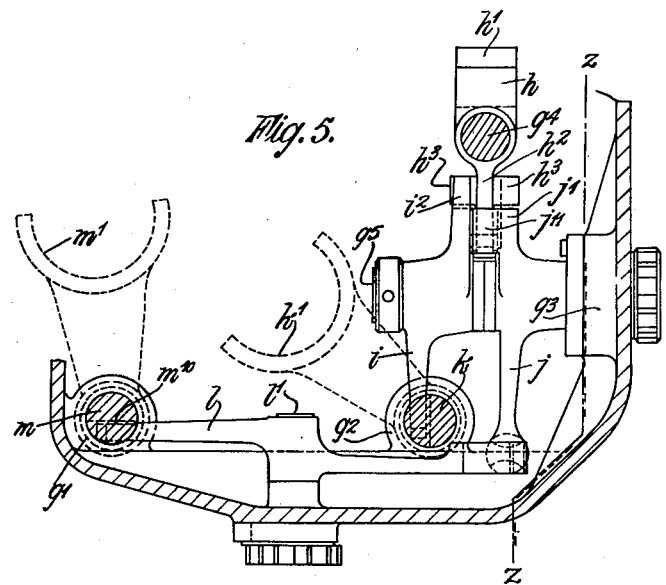
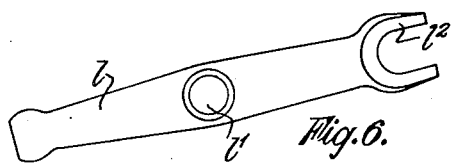

Patented Nov. 18, 1924.

1,516,309

UNITED STATES PATENT OFFICE.

FREDERICK HENRY ROYCE, OF DERBY, ENGLAND, ASSIGNOR TO ROLLS ROYCE LIMITED, OF DERBY, ENGLAND.

CHANGE-SPEED-GEAR MECHANISM FOR MECHANICALLY-PROPELLED VEHICLES.

Application filed May 14, 1924. Serial No. 713,282.

*To all whom it may concern:*

Be it known that I, FREDERICK HENRY ROYCE, residing at Derby, England, a subject of the King of Great Britain and Ireland, have invented certain new and useful Improvements in Change-Speed-Gear Mechanism for Mechanically-Propelled Vehicles, of which the following is a specification.

This invention relates to change speed gear mechanism for mechanically propelled vehicles and embodies improved means for moving the pinions of said mechanism into and out of mesh.

In the most common type of change speed gear mechanism where for example three forward speeds and a reverse are provided, the engine and driven shafts are concentric, and a lay shaft is provided carrying pinions respectively of the required radial dimensions for the different speeds, one of said pinions being in constant mesh with a pinion on the engine shaft. An auxiliary lay shaft also carries a "third" pinion for "reverse" drive, and the driven shaft carries two axially slidable pinions of different radial dimensions, the larger of which can be moved to mesh with the smallest pinion on the lay shaft for the first speed, and also with the "third" pinion of the "reverse" which is in constant mesh with the smallest pinion on the lay shaft. The required movement of the pinions for change of speed is effected by means of two sliding members each carrying a fork which will move one pinion into any of three positions viz, to a neutral position and a position in mesh on each side of said neutral position, the pinion so acted upon always moving in the same direction as the sliding member.

The object of my invention is to enable one sliding member, hereinafter referred to as the main "slider", by a fore or aft movement to move either one of two pinions on separate shafts in the same direction irrespective of the direction in which the slider is moved from the neutral position.

Accordingly I can by my invention, for example, arrange the large pinion on the driven shaft which engages with the smallest pinion on the lay shaft for first speed to be rigidly and the "third" pinion of the reverse to be rotatably rigidly keyed to their respective shafts, and both the smaller pinion on the lay shaft and also the "third" pinion of the reverse to be axially slidable, and when out of mesh to be on the same side of the large pinion, and either one or the other to be moved in the same direction from neutral to mesh with the large pinion by one slider, according to which way the said slider is moved.

The object of the invention is achieved by making the slider, according to whether it is moved in one direction or the other, cause either one or the other of two auxiliary sliders (which by means of forks move the pinions axially into or out of mesh) to move in the same direction.

The main slider causes to rotate through a suitable angle (which might be an angle of 90° or less according to the extent of effective movement required in the auxiliary sliders) a shaft provided with two eccentrics (which may take the form of cranks or of two pivots on a sector or some other suitable form) whose radial relation to the shaft is such that the two planes containing them respectively and the axis of the shaft are at right angles or bear some smaller angle to one another. A connecting rod is attached to each of these eccentrics at one end, the other being directly or indirectly operatively connected to one of the auxiliary sliders.

It will be obvious that the members can be so arranged that a rotation of the shaft in one direction will cause the farther end of one of the connecting rods and hence one of the auxiliary sliders to move farther than the other, while a rotation in the other direction will have the converse effect, and that while the movement of one can be made substantial, the movement of the other may be comparatively negligible. The preferred and most effective arrangement is as follows:—

I so arrange the members that when the auxiliary sliders are in the neutral position, that is to say with neither of the pinions which they respectively control in mesh, the farther ends of the rods (that is, the ends remote from the eccentrics) lie in a plane which also contains the axis of the shaft, and the eccentrics lie one on each side of such plane and equi-distant therefrom.

Preferably the main slider is provided with a rack which engages a toothed sector on the shaft, and the farther ends of the connecting rods are hinged to levers which actuate the auxiliary sliders.

In another form of my invention, the main slider is mechanically connected with each of the auxiliary sliders through separate mechanisms and its method of engagement with each of the mechanisms is such that when moving in one direction it engages with and actuates one only of the mechanisms, and when moving in the other direction it engages with and actuates the other only, and in one of such mechanisms there is an additional lever which is fulcrumed between the actuated, and the actuating, arms thereof, so that the auxiliary sliders, when moved from their positions of "neutral," will move in the same direction.

Embodiments of the invention are illustrated in the accompanying drawings in which:—

Figs. 1, 2 and 3 illustrate an example of one form of mechanism and Figs. 4, 5, and 6 an example of a second form.

Fig. 1 is a section (on line X—X of Fig. 2) through part of the gear mechanism, showing in elevation the gear striking mechanism. Fig. 2 is an end elevation of the mechanism viewed from the left hand side of Fig. 1 and Fig. 3 is a sectional detail view showing a crank shaft and toothed sector hereinafter referred to from the same point of view as seen in Fig. 2 but with parts of the mechanism removed.

Fig. 4 is a part sectional elevation on line Z—Z of Fig. 5 viewed from the right hand, Fig. 5 is a part sectional elevation of Fig. 4 on line Y—Y and Fig. 6 is a detail plan view of a part shown in Fig. 5.

To first refer to Figs. 1 to 3, $a$ designates a part of the gear box casing; $a^1$ $a^{11}$ $a^{111}$ are bosses formed on the fore and aft ends of said casing and $a^2$ $a^{22}$ $a^{222}$ are bosses formed on the sides of the casing.

$b$ designates the main slider, formed with jaws $b^1$ to receive the usual change speed gear lever (not shown) and with a rack $b^2$, said slider being supported and sliding in holes through bosses on the casing, one of which bosses is shown at $a^{111}$ in Fig. 1.

$c$ designates a toothed sector formed with a sleeve $c^1$ mounted freely on a pin $c^2$ supported by the boss $a^2$ and having formed thereon a web $c^3$ supporting two pivot pins $c^4$ and $c^5$.

$d$ and $d^1$ designate auxiliary sliders supported and sliding in holes in bosses $a^1$ and $a^{11}$ on the casing. Said auxiliary sliders are formed with recesses $d^2$ to receive levers $e$ and $e^1$ hereinafter referred to, and carry forks $d^3$ and $d^{33}$ respectively for moving the pinions.

$e$ and $e^1$ designate two levers formed with bosses $e^2$ having holes therethrough mounted on a pin $e^3$ which is secured in the casing bosses $a^{22}$ and $a^{222}$. The levers terminate below in disc ends $e^5$ which engage the recesses $d^2$ of the auxiliary sliders. In Fig. 1 the upper part of lever $e$ and lower part of lever $e^1$ are shown as one entity consequent on the cross section represented in the figure.

$f^1$ and $f^2$ designate two links provided with jaws $f^{11}$ and $f^{22}$, pivoted at one end to the crank pins $c^5$ and $c^4$ respectively and at the other end to the levers $e$ and $e^1$ by rivets $f^3$.

With mechanism as above described, whichever way the main slider $b$ is moved one or the other of the auxiliary sliders $d$ or $d^1$ will be moved, in the same direction.

To now refer to the construction shown in Figs. 4 to 6, $g$ designates the gear casing, having bosses $g^1$, $g^2$ and $g^3$ formed thereon with holes therethrough for the purposes hereinafter described; $g^4$ designates a bar of circular cross section supported by the walls of the casing, and $g^5$ a pin on which are fulcrumed two levers $i$ and $j$ hereinafter described, supported from the boss $g^3$.

$h$ designates the main slider slidably mounted on the bar $g^4$, and having jaws $h^1$ to engage the actuating lever, (not shown). A flattened extension $h^2$ of the slider has projecting therefrom (one on each side) pins $h^3$, and said slider carries also a further extension $h^4$ resembling an inverted T, the horizontal member of which is, in all positions of the slider, held between bosses on the two levers $i$ and $j$, to locate the slider rotatably on the bar.

The said levers $i$ and $j$ are mounted and fulcrumed on the pin $g^5$ which extends from the casing boss $g^3$; $i^1$, $i^2$ and $j^1$ $j^2$ are arms on the upper ends of the levers $i$ and $j$ respectively, the arms $i^1$ and $j^1$ having formed thereon laterally projecting lugs $i^{11}$ and $j^{11}$ which overlap the flattened extension $h^2$ of the slider, by means of which they are engaged by said slider, the arms $i^2$ and $j^2$ being also engaged by the slider through the pins $h^3$.

$k$ designates an auxiliary slider adapted for sliding movement in the boss $g^2$ and formed with a slot $k^{10}$ which is engaged by the lower arm of the lever $i$, said slider carrying a fork $k^1$.

$l$ designates a lever rocking on a pin $l^1$ extending from the gear casing and provided with jaws $l^2$ which are engaged by the lever $j$, and $m$ designates a second auxiliary slider adapted for sliding movement in the boss $g^1$, and provided with a slot $m^{10}$ which is engaged by the lever $l$, said slider carrying a fork $m^1$.

The operation of the above described apparatus is as follows: If the main slider $h$ is moved to the left in Fig. 4, the pin $h^3$ shown in dotted lines will engage the arm $i^2$ of the lever $i$ and cause the lower arm of said lever to move the auxiliary slider $k$ to the right and at the same time the flattened extension $h^2$ of the main slider will engage the lug $j^{11}$ on the arm $j^1$ of lever $j$ and will accordingly lock said lever. If the main slider is moved to the right in Fig. 4, the pin $h^3$ shown in full lines will engage the arm $j^2$ of lever $j$ and cause the lower arm of said lever to actuate the lever $l$ which will cause the auxiliary slider $m$ to move to the right, and at the same time in like manner lever $i$ will be locked.

With mechanism arranged according to my invention it is possible in the type of gear referred to, to make a shorter gear box or casing than by means heretofore in use, while at the same time ensuring that there are only two sliders to be operated by the hand lever and that the reverse pinion is normally out of mesh and at rest.

What I claim as my invention and desire to secure by Letters Patent of the United States is:—

1. In change speed gear mechanism having two axially movable gears on two shafts, the combination of a main slider, a shifting member for each gear, and connections between the slider and gear-shifting members for moving one or the other of said members and its associated gear in the same direction according to whether said slider is moved in one direction or the other.

2. In change speed gear mechanism having two axially movable gears on two shafts, the combination of a main slider and means whereby one or the other of said gears is moved in the same direction according to whether said slider is moved in one direction or the other; said means comprising a shaft adapted to be rotated in one direction or the other by said slider, two eccentric members associated with said shaft, separate auxiliary sliders associated with said gears, and operative connections between said eccentric members and auxiliary sliders.

3. In change speed gear mechanism having two axially movable gears on two shafts, the combination of a main slider and means whereby one or the other of said gears is moved in the same direction according to whether said slider is moved is one direction or the other; said means comprising a sector operated by said main slider, a shaft on which said sector is mounted, two eccentrics carried by said shaft, and two auxiliary sliders and two interconnected links and levers between said eccentrics and auxiliary sliders.

4. In change speed gear mechanism having two axially movable gears on two shafts, the combination of a main slider and means whereby one or the other of said gears is moved in the same direction according to whether said slider is moved in one direction or the other; said means comprising two auxiliary sliders associated with gears, and separate mechanisms connecting the main slider to said auxiliary sliders respectively and actuated by moving the main slider in one direction or the other, one of such mechanisms comprising a lever fulcrumed between actuated and actuating members of said latter mechanism.

In witness whereof I have signed this specification.

FREDERICK HENRY ROYCE.